United States Patent [19]

Schultz et al.

[11] 3,939,343
[45] Feb. 17, 1976

[54] PULSED NEUTRON LOGGING SYSTEM FOR INELASTIC SCATTERING GAMMA RAYS WITH GAIN COMPENSATION

[75] Inventors: Ward E. Schultz; Harry D. Smith, Jr., both of Houston, Tex.

[73] Assignee: Texaco Inc., New York, N.Y.

[22] Filed: Mar. 4, 1974

[21] Appl. No.: 447,593

[52] U.S. Cl. .............. 250/262; 250/270; 250/354
[51] Int. Cl.² ................................................ G01V 5/00
[58] Field of Search .......... 250/252, 261, 263, 267, 250/262, 270, 354

[56] References Cited
UNITED STATES PATENTS

| 3,226,544 | 12/1965 | Clark | 250/262 |
|---|---|---|---|
| 3,270,205 | 8/1966 | Ladd et al. | 328/117 |
| 3,560,744 | 2/1971 | Jordan | 250/252 |
| 3,780,301 | 12/1973 | Smith et al. | 250/301 |
| 3,829,686 | 8/1974 | Schultz et al. | 250/270 |

*Primary Examiner*—Harold A. Dixon
*Attorney, Agent, or Firm*—T. H. Whaley; C. G. Ries; William J. Beard

[57] ABSTRACT

An illustrative embodiment of the invention includes methods for linearizing the gain of borehole gamma ray energy measurement apparatus. A known energy peak (or peaks) which is prominent in the gamma ray energy spectra of borehole measurements is monitored and any drift in its apparent location in the energy spectrum is used to generate an error voltage. The error voltage is applied in an inverse feedback manner to control the gain of system amplifiers to cancel the drift.

3 Claims, 3 Drawing Figures

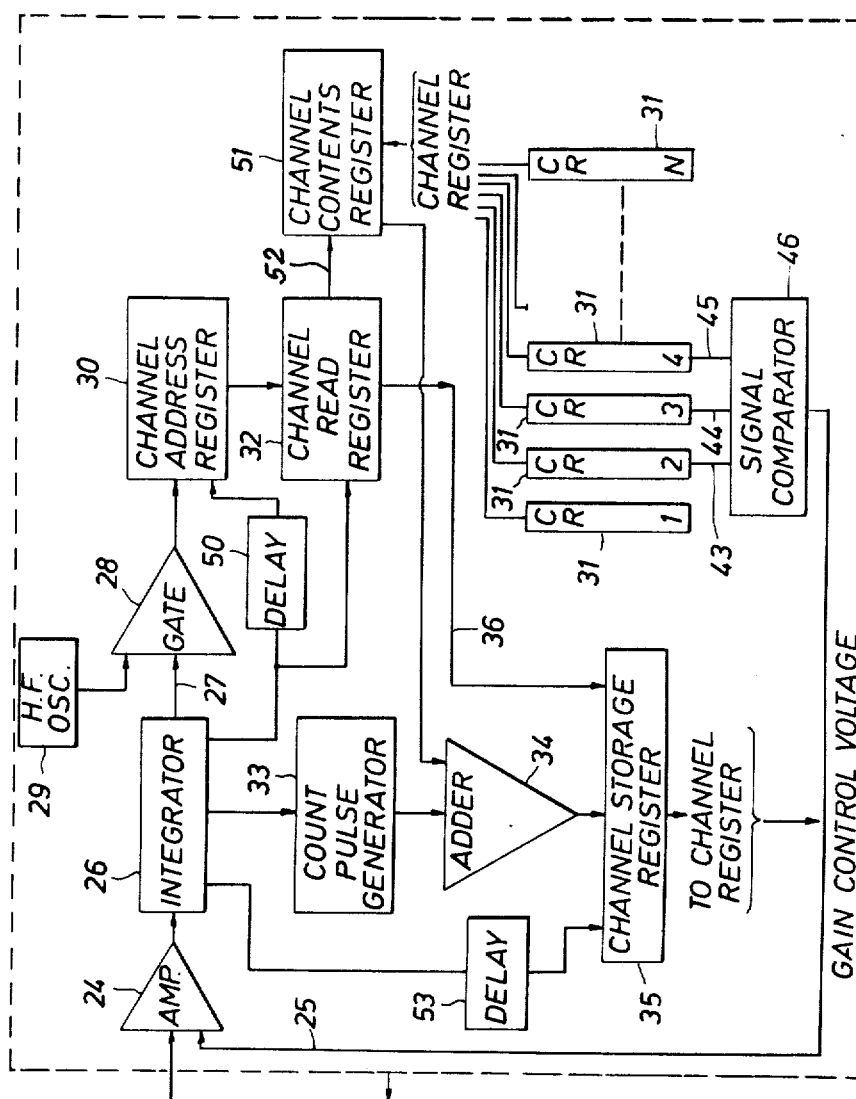
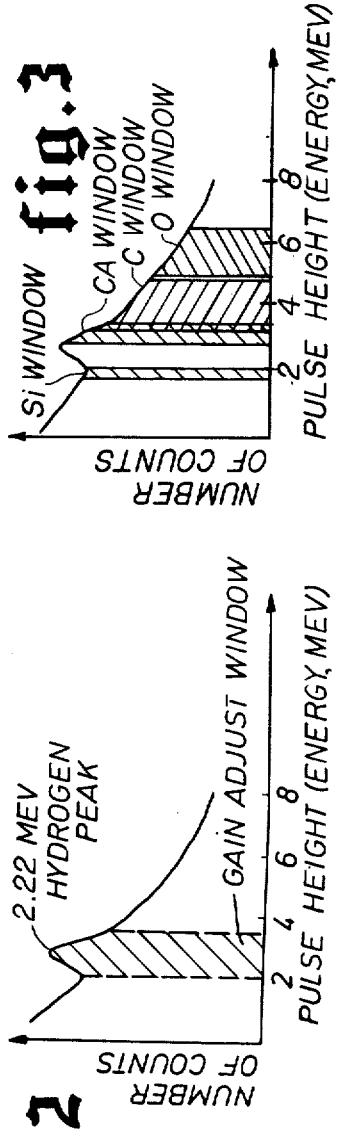
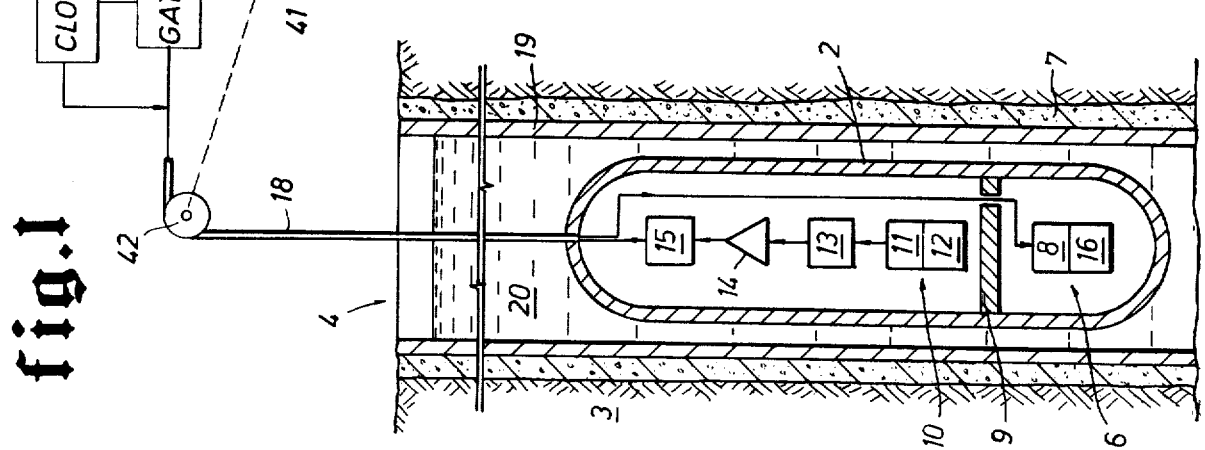

PULSED NEUTRON LOGGING SYSTEM FOR INELASTIC SCATTERING GAMMA RAYS WITH GAIN COMPENSATION

BACKGROUND OF THE INVENTION

This invention relates to radiological well logging methods and apparatus for investigating subsurface earth formations traversed by borehole and, more particularly to gain control means for use in gamma ray energy spectra well logging systems.

It is well known that oil and gas are more likely to be found in commercially recoverable quantities in those earth formations which are relatively porous and permeable than in more highly consolidated formations. It is also well known that an oil or gas filled earth formation or strata may be located by irradiating the earth formations surrounding a borehole with neutrons and measuring the intensity of the resultant gamma radiations which are produced at various levels in the borehole. Various proposals for measuring either the thermal capture gamma ray spectra of such earth formations irradiated with neutrons or the inelastic scattering spectra of the earth formations so irradiated have been proposed in the prior art.

Typical well logging systems proposed in the prior art for measuring these types of gamma ray energy spectra have included neutron generating means and gamma ray detecting means suspended via a well logging cable in the borehole. Surface processing equipment is also usually provided for interpreting electrical pulses produced in response to the gamma rays by the detection means. Usually proportional detectors of the scintillation type have been proposed for measuring the quantity and energy of gamma rays occurring from the resultant neutron irradiation. Electrical pulses whose amplitude is representative of the energy of gamma rays passing through a detector crystal are sent to the surface via the well logging cable. The surface equipment processes these pulses in some manner usually in order to determine the numerical distribution of pulses as a function of their pulse height.

It is apparent that in a system of this sort in which both the pulse height and the number of pulses contains valuable information, that the linearity and repeatability of the system is very important in the accuracy of the resultant measurements. It has been proposed, for example, in a copending application Ser. No. 82,028 filed Oct. 19, 1970, now abandoned, which is assigned to the assignee of the present invention, to utilize a compensating circuit which adjusts the gain of the amplification which takes place at the surface in response to a known amplitude signal generated in the downhole equipment in order to preserve the linearity of the system. This known amplitude signal in the above-mentioned copending application is provided by a downhole pulse generator designed to generate pulses of a desired height, or voltage level, for this purpose.

Gain compensating circuitry such as that disclosed in the above-mentioned copending application has proven to be very useful. The borehole temperature varies nonlinearly as a function of depth. Hence any temperature compensation techniques used in the downhole circuitry or the surface circuitry taken by themselves could be ineffective. Moreover, the effect of the temperature distribution on the cable is unpredictable and the attenuation therefrom can cause an apparent gain drift in the system. In the system described in the above copending application the downhole pulser signal is injected into the system at a point subsequent to the development of the pulse height information by the downhole photomultiplier tube and detector crystal, but before it enters the logging cable. Thus surface or cable generated nonlinearities may be compensated for. Nonlinearities may be introduced into the measurements by the photomultiplier tube itself, however, as opposed to the cable or the other electronics in the system. Also, the detector crystal may introduce nonlinearities into the measurement if its temperature should vary over an extensive range. Nonlinearities introduced from these sources would be uncorrectable.

Accordingly it is an object of the invention to provide a new and improved hydrocarbon indicator well logging system which is less sensitive to changes in gain than previous such systems in the prior art.

Another object of the present invention is to provide improved well logging systems for obtaining the inelastic gamma ray energy distribution due to fast neutron scattering from subsurface earth formations in a manner more accurate than heretofore possible.

The above and other objects, features, and advantages are provided by the present invention which includes methods for generating a gain control signal voltage for controlling the gain of signal processing and analyzing circuitry based on the known position of a particularly recognizable energy peak in the gamma ray energy spectra of the subsurface earth formation.

In the invention downhole neutron generator means is provided together with gamma ray detection means and amplification means for sending resulting electrical pulses to the surface over a well logging cable. At the surface the gamma ray pulses are introduced into a pulse height analyzer apparatus which includes novel gain control circuitry which is pre-set to observe a particular known energy peak or feature occurring in the gamma ray spectra of the subsurface earth formations. In a particular embodiment described in more detail herein the 2.22 MEV hydrogen gamma ray energy spectrum peak is used for this purpose. After an initial set up, the hydrogen peak is centered in an energy range which is monitored by the gain control circuitry. Any nonlinearity or drift in the gain of the system is compensated for by the gain control circuitry which develops an error signal proportional in magnitude and whose algebraic sign is proportional to the direction of the drift. This error or gain control voltage is applied in an inverse feedback manner to compensate and maintain linearity of the amplification of the system. In this manner the known energy hydrogen peak is kept in the energy window being monitored.

The foregoing and other objects, features and advantages of the invention will appear more fully hereinafter. The detailed description which follows together with the accompanying drawings illustrate an embodiment of the present invention. It is to be understood, however, that the drawings and descriptions herein are for illustrative purposes only and are not to be construed as defining the limits of the invention.

BRIEF DESCRIPTION OF THE DRAWINGS

FIG. 1 is an overall simplified block diagram illustrating the principles of the present invention in use in a well logging system.

FIG. 2 is a graphical diagram illustrating the relative position and amplitude in a gamma ray energy spectrum of the known 2.22 MEV hydrogen peak used for gain control purposes in the invention.

FIG. 3 is a graphical diagram illustrating energy windows used in an inelastic neutron scattering log system in order to optimize gain change effects on the accuracy of such a system.

DESCRIPTION OF THE PREFERRED EMBODIMENT

Referring now to FIG. 1 there may be seen a simplified functional and partly pictorial representation of the basic features of the well logging system illustrative of the present invention. More particularly, the system may be seen to be composed of a subsurface probe or sonde 2 which is suspended at one end of a well logging cable 18 and which provides data in the form of electrical signals or pulses to surface instrumentation which is connected to the other or upper end of the cable 18.

Referring to the system in greater detail the sonde 2 is illustrated as being composed of a fluid tight elongated steel housing which is adapted to be passed longitudinally through a borehole 4 in the earth formations 3 and which contains a neutron source 6 and a radiation detector 10, which for present purposes is preferably a scintillation counter, comprised of a photomultiplier 11 and a scintillating crystal 12. As previously discussed, the neutron source 6 bombards adjacent sections of the earth formations 3 which high energy neutrons such as that produced by the well known deuterium-tritium reaction (14 MEV neutrons) as the sonde 2 is moved vertically upwards in the borehole 4 by the cable 18. The scintillation counter 10 functions to detect a representative number of gamma rays emanating from the earth formations 3 as a result of such neutron bombardment. A radiation shield 9 of suitable composition is preferably interposed between the scintillation counter 10 and the neutron source 6 to prevent direct irradiation of the counter 10 by the source 6.

High energy neutrons such as those produced by the neutron generator 6 easily penetrate the steel casing 19 and its surrounding cement layer 7 to enter the surrounding earth formations 3. Either prompt gamma rays resulting from inelastic scattering of the neutrons or the later arriving capture gamma rays generated by the elements comprising the surrounding earth formations may be detected by the passage of the resulting gamma radiation through the detector crystal 12 which may be thallium doped sodium or cesium iodide or the like. The light flashes resulting therefrom are converted to electrical pulses whose height or voltage level is proportional to the intensity of the light flashes by the photomultiplier tube 11. If desired, an energy discriminator 13 may be used to permit only pulses having a pulse height corresponding to gamma ray energies above a certain predetermined energy level to be passed to the amplifier 14 and the cable driving circuit 15 for transmission to the earth's surface over the cable 18.

The bias level or energy discrimination level set on the discriminator 13 may be used if desired to appropriately screen out pulses corresponding to background gamma rays of energy lower than a predetermined level. Such background could be caused by neutron activation of the iodine in the crystal itself. This reduces the number of count pulses placed on the cable and hence reduces the bandwidth requirements on the cable 18.

In the above-mentioned copending application, a downhole pulser or oscillator generating signal pulses of a known amplitude introduces such pulses at the level of the discriminator 13 into the system. These known amplitude pulses then traverse the cable 18 to the surface circuitry. It will be noted however that all system components which come prior to the discriminator 13 in such a system can still generate nonlinearities due to environmental condition changes. In the present invention however it is proposed to use a known peak which occurs in the gamma ray energy spectrum and which has a sufficient amplitude to be discernable and usable in nearly every borehole of interest to be logged. Such a peak, for example, could be the 2.22 MEV hydrogen capture gamma ray peak caused by interaction of the neutrons with hydrogen nuclei in the borehole fluid itself and in the surrounding earth formations.

Usually the borehole 4 is filled with a well fluid 20 during the logging operation. The fluid usually comprises an oil, water or drilling mud. Either type of fluid will have a substantial hydrogen content and therefore will have a predominant 2.22 MEV hydrogen line peak in its gamma ray energy spectrum. As the energy of this peak is accurately known, it may be used as will be subsequently described to control the overall amplification gain factor of the system to maintain the linearity thereof.

The system of FIG. 1 is further illustrated by the signal processing circuitry at the surface. When pulses arrive at gate 21 at the surface if they have occurred at a proper time, as determined by timing pulses generated by the clock pulse generator 22, they are passed on to the pulse height analyzing apparatus for determination of their energy content. Pulses from the clock pulse generator 22 are also coupled to the logging cable 18 for control of the downhole neutron source via a pulsing circuit 8 which controls the accelerator portion 16 of the neutron generator. In this manner the neutron generator may be turned on and off on the basis of timing information provided by the clock pulse generator 22. Thus synchronization may be maintained between the surface signal processing circuitry and the downhole equipment. For example, the clock pulse generator 22 may supply a timing pulse indication to the downhole pulser 8 to turn on the accelerator 16 for a predetermined duration of time. Simultaneously the clock pulse generator 22 may generate a conditioning signal to the gate 21 to prevent counts occurring during the generation of the neutron pulse by the downhole neutron generator 6 from passing through the gate 21 to the surface data processing circuitry. In this manner, gamma rays caused by neutron capture events would be the primary data source input to the pulse height analyzer and therefore the 2.22 MEV capture gamma ray would not have reduced resolution caused by interfering gamma rays, such as inelastic gamma rays. Alternatively, gate 21 may be used to select only those pulses corresponding to gamma rays occurring during a neutron burst. In this event the gamma rays produced by inelastic scattering of the fast neutrons would be emphasized. In any event the input signals on the line 23 to the pulse height analyzing circuitry comprise a series of pulses each of whose amplitude is indicative of the energy which the gamma ray causing it lost in the detector crystal. This, in turn, is related to the energy of the gamma ray.

Immediately upon entry into the pulse height analyzer the input signal on line 23 is amplified by a gain controlled amplifier 24. The amplifier 24 is a linear operational amplifier having a wide dynamic range and whose gain may be controlled and adjusted by a feedback voltage signal on a line 25. This feedback voltage signal may be derived in the manner to be discussed subsequently. The amplified signal is then coupled to an integrator 26 whose functions to generate and temporarily store a voltage level proportional to the height of the input pulse. The integrator 26 immediately supplies on line 27 a conditioning pulse to a gate 28. The conditioning pulse permits the gate 28 to pass sharp spike-like voltage pulses suitable for digital counting from a high frequency oscillator 29. The high frequency oscillator 29 output voltage pulses pass through the gate 28 and are summed in a channel address register 30 for the entire time that the gate 28 remains open. The channel address register 30 comprises a binary counting register which keeps a running sum of all the counting pulses from the high frequency oscillator 29 which pass through the gate 28 when conditioned by the integrator circuit 26. The gate 28 remains open as long as the integrator 26 provides a voltage on line 27 which exceeds the conditioning level of the gate 28.

After initially generating a voltage level proportional to the input pulse height the integrator 26 voltage begins to discharge through a bleeder resistor (not shown). After a finite length of time (depending on the value of the bleeder) the voltage will fall below a predetermined threshold level. At this time the integrator ceases to provide a conditioning signal on line 27 to the gate 28 and thus the high frequency oscillator output counting pulses are cut off from being summed into the channel address register 30. Simultaneously with this occurrence the integrator circuit 26 provides a reset pulse to the channel address register 30 via delay line 50 and a read pulse to the channel read register 32. This read pulse causes the channel read register 32 to accept the contents of the channel address register 30 as input to itself just prior to the resetting of the channel address register 30 to zero by the reset pulse provided by the integrator circuit 26. The delay line 50 delays the reset pulse provided by the integrator 26 for a sufficient time to allow the reading operation by the channel read register 32 to occur before the channel address register 30 is reset to zero. This binary number, which now resides in the channel read register 32 may be thought of as the address of a particular energy channel (or energy range), and is indicative of the energy of the downhole produced gamma ray data pulse just processed. Such a number may be used to index a particular one of a plurality of channel registers 31 which are binary memory registers comprising the addressable memory of the pulse height analyzer. There are N such binary registers having addresses 1 to N comprising this memory array. These binary address registers 30 and 32 are n bits in length where $2^n = N$. Thus, for example, if there are a total of 1024 channel registers in the pulse height analyzer each address containing register 30 32 is 10 bits or binary digits in length since $2^{10} = 1024$. Thus the channel registers 31 are directly addressable in an individual sense based on the contents of the channel read register 32. The channel read register 32 is used to examine the contents of the particular channel register 31 which the binary contents of the channel read register 32 indexes. Upon the appearance of a new read pulse from integrator 26 the contents of the indexed channel register 31 is read into a channel contents register 51. The individual channel registers 31 contain at any given instant in time the sum of the number of counts which have occurred in the energy range or channel indexed by or corresponding to their address as will be explained.

As just described, the channel contents register 51 when appropriately indexed by the channel read register 32 as indicated by lead line 52 summons the contents of the indexed channel register 31. A count pulse generator 33, which is conditioned by an output pulse from the integrator 26 which occurs when the gamma ray data pulse has decayed below the aforementioned threshold value, generates a count pulse of a predetermined amplitude and duration appropriate for binary addition into the contents of the channel contents register 51 by a binary adder 34. The contents of the channel contents register 51 are thus supplied to the binary adder 34, incremented by adding the count pulse supplied from count pulse generator 33, and the resultant sum is supplied to a channel storage register 35. Channel storage register 35 is also indexed (or addressed) by the channel add address register 30 via line 36. Upon receipt of a delayed write pulse from integrator 26 via delay line 53 the resultant new sum is placed back into the same channel register 31 from which the previously unincremented sum was located. Delay line 53 functions to delay the write pulse from integrator 26 (which occurred when the voltage level on the integrator 26 fell below the aforementioned threshold value) until the intermediate steps just described have had time to occur.

In this manner whenever a new data pulse appears from downhole on the input line 23 its amplitude is measured by the integrator 26, gate circuit 28, oscillator 29, channel address register 30 and appears in digital form in channel read register 32. This information is used as an index address to add one count in adder 34 into the contents of the indexed channel register 31 corresponding to the energy range of the input gamma ray data pulse. Thus a running sum is kept in each channel register 31 of the number of counts occurring in its energy range for a predetermined time interval. This information may then be interpreted by display on analog or digital plotting means or may be processed further by other signal processing circuitry 40 as desired. The resultant data may then be recorded as a function of borehole depth by recorder 41 which is mechanically or electrically linked with the sheave wheel 42 and driven so that the record medium contained thereon is moved as a function of the borehole depth of the downhole sonde 2 as it moves through the borehole.

It will be appreciated by those skilled in the art that the above description of a pulse height analyzer describes the operational principles of only one type of pulse height analyzer which may be used. Other pulse height analyzers such as the Technical Measurements Corp., Model 262 which convert the analog pulse height information into a digital number in different manners may be used if desired and the invention is not limited to the use of the type just described.

Referring now to FIG. 2 a gamma ray energy spectrum resulting from the pulse height analysis of the pulses generated by the downhole tool of FIG. 1 is illustrated schematically. In this gamma ray energy spectrum it will be noted that a prominent peak occurs at 2.22 MEV. This peak could occur in the energy range, for example, corresponding to the three channel registers whose addresses are 2, 3 and 4 of FIG. 1, if desired. For illustrative purposes, let us assume that channel registers 2, 3 & 4 of the pulse height analyzer of FIG. 1 fall within the shaded region of the gamma ray spectrum marked "gain adjust window" in FIG. 2 with the peak (2.22 MEV) occurring in channel 3. The contents of channel register 2, 3 and 4 are input on lines 43, 44 and 45 to a signal comparator circuit 46. The signal comparator circuit 46 comprises three digital to analog converters which convert the digital contents of channel registers 2, 3, and 4 into analog voltage levels. The analog voltage levels corresponding to the contents of channel registers 2 and 4 are compared with that corresponding to channel 3 in signal comparator 46. A voltage signal is provided by comparator 46 on line 25 whose amplitude is proportional to the difference between the contents of channel register 3 (the peak) and the contents of either channel register 2 or channel register 4 whichever difference is larger. The algebraic sign of this voltage signal is indicative of whether the difference signal so generated results from the difference between channel register 3 and channel register 2 or between channel register 3 and channel register 4.

Since channel register 3 is chosen initially to coincide with the 2.22 MEV hydrogen peak on the gamma ray energy spectrum of FIG. 2, then if any gain drift occurs in the system the peak will tend to drift out of the range of channel register 3 and into the range of either channel register 2 or channel register 4 due to the resultant nonlinear amplification of the pulses generated by the system. When this occurs the signal comparator circuit 46 will detect a change in the relative proportion of counts, for example in channel register 3 and in channel register 2, and will generate an error signal of appropriate sign and amplitude. This error signal is fed back via line 25 to the control input of amplifier 24 of the pulse height analyzer and will cause a change in the gain of the amplifier 24 to compensate for the drift.

In this manner the 2.22 MEV hydrogen peak will be kept centered in channel register 3 and thus the center energy of channel register 3 will be kept in correspondence with the reference energy level 2.22 MEV. This principle could be extended if desired by monitoring another energy peak or more than one energy peak in the gamma ray spectrum in a similar manner. Error signals generated by the monitoring of a plurality of such energy peaks in the gamma ray spectrum could then be combined by logic circuitry in an appropriate manner to determine how the feedback or control voltage should effect the gain and/or baseline of the input amplifier stages of the pulse height and analysis apparatus. The baseline, of course, is the energy level of the lowest energy channel of the system.

A well logging gain control system as hereinbefore described has been found to be particularly useful when employed in conjunction with a logging system for hydrocarbon detection such as that described in U.S. Pat. 3,780,302 which is assigned to the assigneee of the present invention. Moreover, a well logging system such as described in the aforementioned U.S. Patent for hydrocarbon detection and using a gain control system such as that described in the copending U.S. patent application Ser. No. 322,573, filed Jan. 10, 1973 has also been found to be particularly advantageous for operations in very fresh water (or borehole fluid) zones in locating and distinguishing hydrocarbon in the pore spaces of such zones.

In the aforementioned hydrocarbon detection system described in U.S. Pat. No. 3,780,302 gamma rays produced by the inelastic scattering of fast neutrons (14 MEV) are detected during a relatively short time duration neutron burst ($\sim$ 7 microseconds duration) which is repeated at a very high repetition rate (up to 20,000 bursts/sec.) in four separate energy windows (or ranges) in the gamma ray energy spectrum corresponding to inelastic gamma rays from carbon, oxygen, silicon and calcium. In the system described therein these energy ranges were chosen to be 3.17 to 4.65 MEV for carbon, 4.86 to 6.34 MEV for oxygen, 1.65 to 1.86 MEV for silicon and 2.50 to 3.30 MEV for calcium.

While the use of these energy ranges have produced excellent results in hydrocarbon logging with the above described logging system employing the gain control methods hereinbeforee described and those described in the aforementioned copending application Ser. No. 322,573, these hydrocarbon detection techniques may be even further enhanced by the employment in such well logging systems of different energy window (or range) settings corresponding to gamma rays produced by the inelastic scattering of fast neutrons by carbon, oxygen, silicon and calcium which have been found to be less sensitive to any slight system gain errors (from absolute linearity), which are possibly still present in such a well logging system due, primarily, to temperature variations in the well bore.

A more optimized set of energy ranges for use in such an application is illustrated graphically in FIG. 3. This illustration schematically shows the placement of four energy windows (or ranges) in the gamma ray energy spectrum which are labelled C window, O window, Ca window and Si window and comprise a set of energy ranges which are less sensitive to any remaining gain drift (non-linearity) extant after the operation of a gain control system such as hereinbefore described. These ranges are 4.86 to 6.62 MEV for Oxygen inelastic gamma rays, and 1.54–1.94 MEV for silicon. The carbon energy window is kept at 3.17 to 4.65 MEV and the calcium energy window is kept at 2.50 to 3.30 MEV as described in the aforementioned patent. Thus when signals representative of the C/O ratio and Ca/Si ratio of counts as a hydrocarbon indicator are made as described in the foregoing patent the increased width of these ranges produces a more consistent result than those obtainable with the previously disclosed systems.

The above description may make changes and modifications of the disclosed principles apparent to those skilled in the art. Such changes as are obvious come under the broader aspects of the invention. It is therefore the aim in the appended claims to cover all such changes and modifications as may fall within the true spirit and scope of the invention.

We claim:

1. A method for controlling and linearizing the gain of an inelastic neutron scattering measurement well logging system for the direct detection of hydrocarbon in the pore spaces of earth formations in the vicinity of a well borehole comprising the steps of:

passing a well logging sonde containing a pulsed source of fast neutrons and a gamma ray detector through a well borehole;

repetitively irradiating at a repetition rate greater than at least 4000 bursts/sec. earth formations in the vicinity of the borehole with relatively short duration bursts of fast neutrons and detecting, essentially during said neutron bursts, gamma rays produced by the inelastic scattering of fast neutrons and thermal neutron capture gamma rays produced by the capture of thermal neutrons from previous bursts at said repetition rate by materials in the vicinity of the borehole;

developing an energy spectrum of gamma radiation emitted essentially only during said neutron irradiating bursts;

developing a gain control signal proportional to the difference in the apparent location in said energy spectrum of gamma radiation attributable to the 2.22 MEV hydrogen capture gamma ray photopeak and its predetermined known location at 2.22 MEV in said spectrum; and controlling the gain of amplification means used in developing said gamma ray energy spectrum in response to said gain control signal so as to minimize said gain control signal.

2. The method of claim 1 wherein the step of developing an energy spectrum of gamma radiation emitted essentially during said repetitive irradiation periods is performed by gating voltage pulses whose amplitude is proportional to the energy of gamma rays causing said pulses, essentially only during said neutron bursts into digital energy measurement equipment having at least four energy windows corresponding to inelastic gamma rays produced by carbon, oxygen, silicon and calcium together with another energy window corresponding to a known elemental energy peak which is used for developing said gain control signal.

3. The method of claim 2 wherein said at least four energy windows comprise approximately 4.86 to 6.62 MEV for oxygen, approximately 1.54 to 1.94 MEV for silicon, approximately 3.17 to 4.65 MEV for carbon and approximately 2.50 to 3.30 MEV for calcium.

* * * * *